(12) United States Patent
Day

(10) Patent No.: US 6,660,049 B1
(45) Date of Patent: Dec. 9, 2003

(54) PROCESS FOR CONTROL OF CRYSTALLIZATION OF INORGANICS FROM AQUEOUS SOLUTIONS

(75) Inventor: Roger L. Day, Rifle, CO (US)

(73) Assignee: Natural Soda AALA, Inc., Rifle, CO (US)

( * ) Notice: Subject to any disclaimer, the term of this patent is extended or adjusted under 35 U.S.C. 154(b) by 208 days.

(21) Appl. No.: 08/741,456

(22) Filed: Oct. 31, 1996

Related U.S. Application Data

(63) Continuation-in-part of application No. 08/688,882, filed on Jul. 31, 1996, now Pat. No. 6,042,622.

(51) Int. Cl.$^7$ ............... C01D 7/00; C01D 7/24
(52) U.S. Cl. .......... 23/300; 23/302 R; 23/302 T; 23/304; 423/422
(58) Field of Search .............. 23/295 R, 298, 23/300, 302 R, 302 T, 304, 305 R; 423/162.2, 421, 422

(56) References Cited

U.S. PATENT DOCUMENTS

| | | |
|---|---|---|
| 1,848,513 A | 3/1932 | Bunn |
| 2,670,269 A | 2/1954 | Rahn |
| 2,954,282 A | 9/1960 | Bauer et al. |
| 3,072,466 A | 1/1963 | Bauer et al. |
| 3,248,182 A | 4/1966 | Herink et al. |
| 3,281,364 A | 10/1966 | Shere et al. |
| 3,705,790 A | 12/1972 | Garofano et al. |
| 3,796,794 A | 3/1974 | Ilardi et al. |
| 3,836,628 A | 9/1974 | Ilardi et al. |
| 3,941,723 A | 3/1976 | Weldes |
| 3,951,849 A | 4/1976 | Vickery et al. |
| 3,975,499 A | 8/1976 | Walden |
| 4,023,935 A | 5/1977 | Levinthal et al. |
| 4,029,782 A | 6/1977 | Bornstein |
| 4,252,834 A | 2/1981 | Inamine et al. |
| 4,277,512 A | 7/1981 | Inamine et al. |
| 4,331,556 A | 5/1982 | Arrhenius |

(List continued on next page.)

OTHER PUBLICATIONS

Green F.A., "Binding of 14 C–Phosphatidylcholine to Sodium Chloride Crystals", *Lipids* 5(2):276–277 (1970), (No month).

(List continued on next page.)

*Primary Examiner*—Wayne A. Langel
(74) *Attorney, Agent, or Firm*—Scully, Scott, Murphy & Presser

(57) ABSTRACT

Process of crystallization of sodium bicarbonate from solution mined Nahcolite pregnant liquor comprising the use of from about 2 to 100 parts per million of lecithin, introduced full strength, made miscible in water with a soap or detergent, saponified with NaOH at a pH of 10–12, or preferably as a mixture of lecithin in pregnant or barren liquor containing $HCO_3^-/CO_3^=$ ions at a pH in the range of from about 8 to 12, preferaby 8–10. The lecithin functions as a crystal growth modifier, producing improved crystal yields, product size classification, improved crystal shape including reduction in dendritic, branched and twinned forms, very significant scale reduction, reduction in wet cake moisture, increase in product bulk density, reduction in both oversize and undersize fractions (the classification phenomenon) and less breakage during drying and handling. The aqueous lecithin premix is preferably added to a pregnant liquor tank, and may also be added in one or more crystallizers in the circuit in batch (timed aliquots) or continuously metered in proportion to throughput. The process may also be applied to crystallization of carbonates, bicarbonates, phosphates, nitrates, sulfates, hydroxides and borates of Na, Li, K, Ca and Mg from aqueous solutions including brines. For commercial scale bicarbonate production the presently preferred range is 2–30 ppm, and for product $-425$ $\mu$m$+45$ $\mu$m the range is about 5–15 ppm. Coarse product ($+425$ $\mu$m) is preferably produced in the range of about 12–30 ppm.

17 Claims, 2 Drawing Sheets

U.S. PATENT DOCUMENTS

| | | |
|---|---|---|
| 4,338,350 A | 7/1982 | Chen et al. |
| 4,384,903 A | 5/1983 | Enever |
| 4,451,383 A | 5/1984 | Arrhenius |
| 4,516,176 A | 5/1985 | Street |
| 4,532,033 A | 7/1985 | Anthes et al. |
| 4,562,058 A | 12/1985 | Dancy et al. |
| 4,678,562 A | 7/1987 | Keys |
| 4,815,790 A | 3/1989 | Rosar et al. |
| 4,818,424 A | 4/1989 | Evans et al. |
| 4,820,441 A | 4/1989 | Evans et al. |
| 4,900,466 A | 2/1990 | Atkinson et al. |
| 5,068,467 A | 11/1991 | Kunimi et al. |
| 5,085,670 A | 2/1992 | Quencer |
| 5,118,815 A | 6/1992 | Shiroshita et al. |
| 5,290,476 A | 3/1994 | Roesler et al. |
| 5,308,637 A | 5/1994 | Richards et al. |
| 5,338,563 A | 8/1994 | Mikulka |
| 5,518,551 A | 5/1996 | Battist et al. |
| 5,518,636 A | 5/1996 | Petrille, III et al. |
| 5,543,950 A | 8/1996 | Lavrentovich et al. |
| 5,601,076 A | 2/1997 | Battist et al. |
| 5,716,419 A | 2/1998 | Larsen .................... 23/330 |
| 5,866,188 A | 2/1999 | Battist et al. |
| 5,919,483 A | 7/1999 | Takaichi et al. |

OTHER PUBLICATIONS

Mullin J.W., *Crystallization*, pp 207–213; and 258–299 (1972), (No month).

Rivarola G. et al., "Influence of Phospholipids on the Crystallization of Waxes in Sunflowerseed Oil", *JAOCS* 65(*11*):1771–1773 (1988), (No month).

Tao S. et al., "Different Processes in Cholesterol Crystal Nucleation: Importance of Fatty Acid Composition in Biliary Lecithin", *Gastroenterology 102*:A899 (1992), (No month).

Garrett D.E., *Natural Soda Ash: Occurrences, Processing, and Use*, pp 282–285; 303–304; and 402–404 (1992), (No month).

Butts D., "Chemicals from Brine", *Kirk–Othmer Encyclopedia of Chemical Technology*, Fourth Edition, vol. 5, pp 817–837 (1993), (No month).

Tazuma S. et al., "Degree of Fatty Acyl Chain Unsaturation in Biliary Lecithin Dictates Cholesterol Nucleation and Crystal Growth", *Biochimica et Biophysica Acta 1215*:74–78 (1994) (No month).

Liu H. et al., "Effects of Crystallization Conditions on Sedimentation in Canola Oil", *JAOCS 71*(*4*):409–415 (1994), (No month).

Konikoff F.M. et al., "Phospholipid Molecular Species Influence Crystal Habits and Transition Sequences of Metastable Intermediates During Cholesterol Crystallization from Bile Salt–Rich Model Bile", *Journal of Lipid Research 35*:60–70 (1994), (No month).

Wendel A., "Lecithin", *Kirk–Othmer Encyclopedia of Chemical Technology*, Fourth Edition, vol. 15, pp 192–210 (1995), (No month).

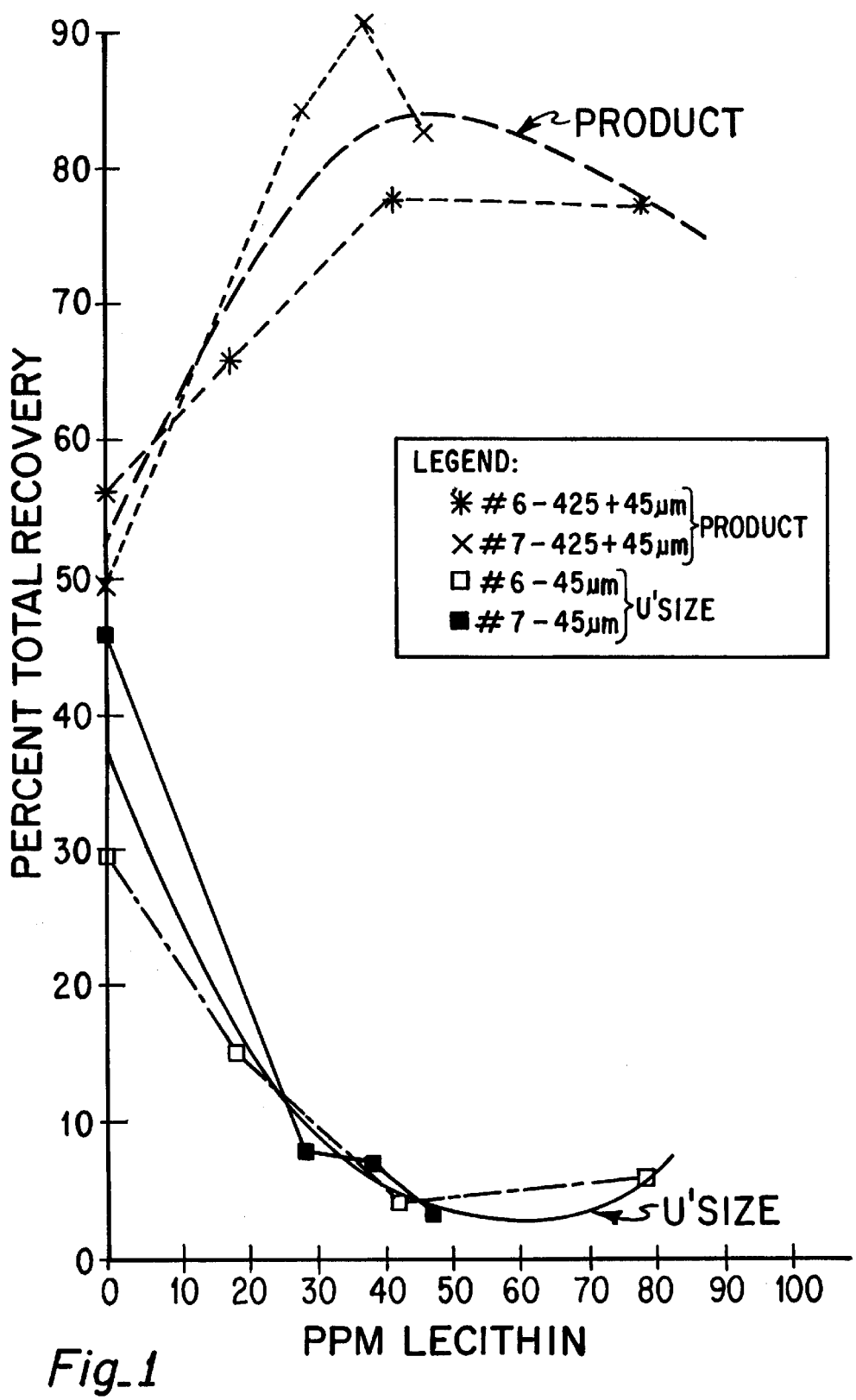
Fig_1

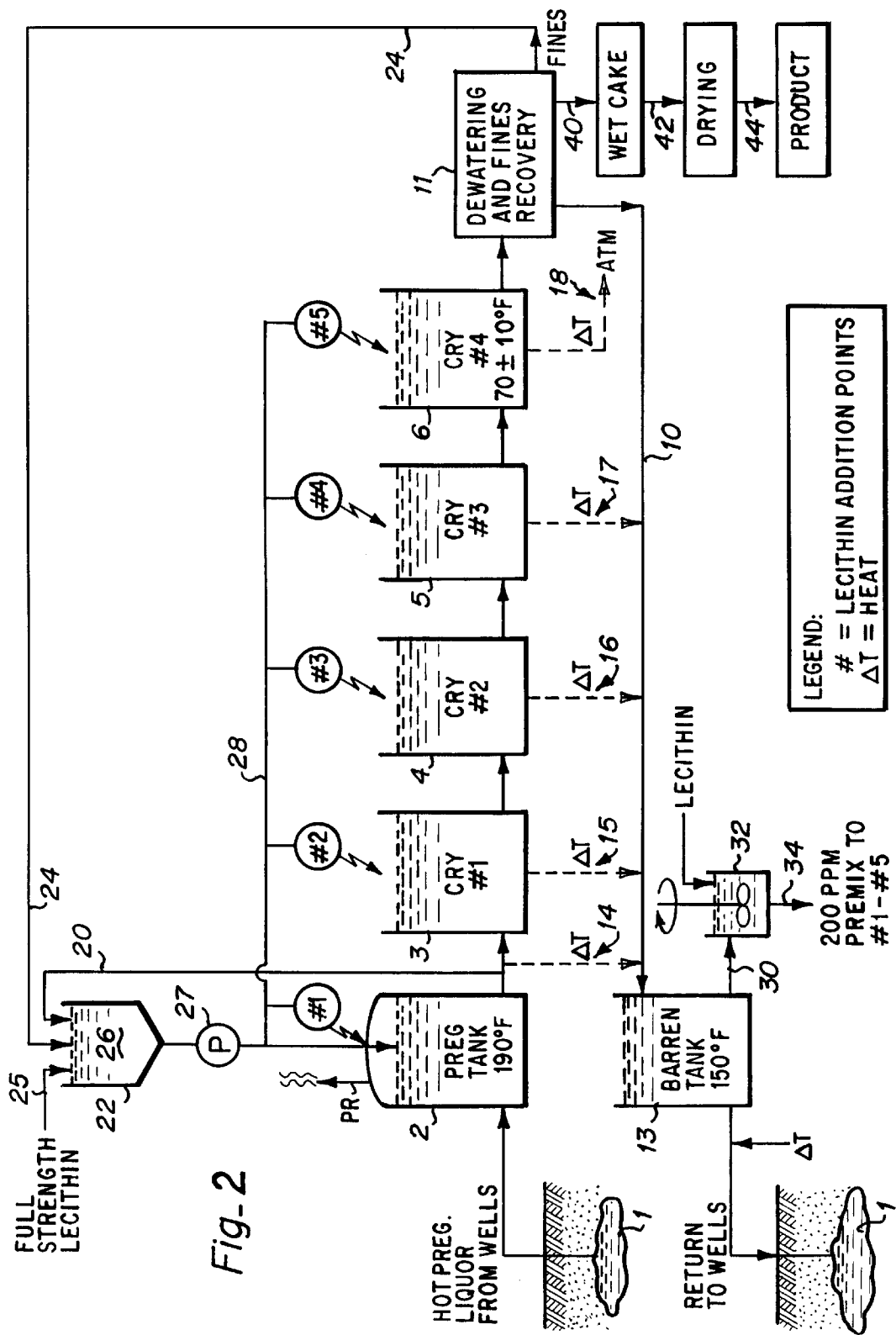

US 6,660,049 B1

PROCESS FOR CONTROL OF CRYSTALLIZATION OF INORGANICS FROM AQUEOUS SOLUTIONS

CROSS REFERENCE TO RELATED APPLICATIONS

This application is a continuation-in-part of copending and commonly assigned application Ser. No. 08/688,882, filed Jul. 31, 1996, now U.S. Pat. No. 6,042,622.

TECHNICAL FIELD

The invention relates to processes for control of crystallization of inorganics, such as Na, Li, K, Ca and Mg bicarbonates, phosphates, borates, hydroxides, nitrates and sulfates from aqueous solutions containing the respective ions thereof. More particularly, the invention relates to the use of lecithin as a generally regarded as safe (GRAS) food grade and Kosher crystal growth promoter and crystal size classifier (size control agent) for the crystallization of sodium bicarbonate from solution mined Nahcolite pregnant liquor.

BACKGROUND

Global sodium bicarbonate demand in 1996 is projected at one million tons per year, with U.S. capacity at about two thirds that amount. There are four major processes for production of sodium bicarbonate, all of which involve crystallization from aqueous solution. The most commonly currently used process involves mining impure Trona mineral which is purified by recrystallization from a hot aqueous solution via intermediate steps of production of sodium carbonate or sesquicarbonate and recarbonation with $CO_2$. A second method involves carbonation of brines rich in sodium, borate, carbonate and bicarbonate ions, such as lake brines, e.g. brines of Owens Lake, Lake Natrona and from Searles Lake, Calif., and Lake Magabi, Tanzania. Still another method involves the production of sodium bicarbonate in the ammonia soda process. Finally, one of the lowest cost processes is solution mining Nahcolite mineral from the evaporate deposits of the Green River Formation in the Piceance Creek Basin, Colo. according to the Nahcolite Solution Mining Process of the: Rosar and Day. U.S. Pat. No. 4,815,790. The pregnant liquor is pumped above ground where it is crystallized at atmospheric pressure and ambient temperature in a series of crystallizers staged in parallel or series.

Crystal nucleation and growth rate from a solution is expressed in terms of crystallization kinetics. Crystal habit is the shape which results from the different rates of growth of the various crystal faces. Both crystallization kinetics and crystal habit influence production costs, product purity, caking, bulk density, dusting, flowability and the like. Both brine concentration, natural and/or induced solution impurities even in low concentrations, impact crystallization kinetics and crystal habit in commercial crystallization operations. Ordinarily, the nature and extent of the impact of such impurities is both adverse and unpredictable.

Impurities in brine or solution mined Nahcolite pregnant liquor change from time to time. These impurities are both inorganic and organic. For example, in Nahcolite solution mining, the Nahcolite beds are typically some 2,000 feet below the surface. Nahcolite beds typically include interbedded stringers, lenses or rosettes of kerogen-containing shale, salt or Dawsonite mineralization, among others. Thus, commercial operations often experience "drift" in which, due to subtle variations in impurity content over time even while maintaining the same mining and crystallizer conditions of temperature, agitation, heat exchange and throughput rate, there can be vast differences in the end product. For example, there can be relatively wide swings in the quantities of "oversized" or "undersized" product, and in the bulk density, caking and friability of the product. That is, the percentage of crystals which are too large and percentage of very fine crystals (called "fines"), may vary over time, in some instances as quickly as within a few days. Where the product crystals are too large, the product becomes unsuitable or uneconomic to use, particularly in food products, or as an $SO_x$ sorbent in pollution control processes, one of the significant uses of sodium bicarbonate. Likewise where the product is too fine, it is difficult to dewater during processing, increases process energy costs, and the resulting product cakes easily, creates dust when handled and is difficult for the customers to use.

As pointed out in the Bauer et al. U.S. Pat. No. 3,072,466, bicarbonate crystals obtained by various commercial crystallization processes in many cases are of inferior quality considering such factors as crystal shape, purity, settling rate, size, uniformity, dewaterability, bulk density and resistance to breakage during handling. The Bauer et al. patent is directed to the use of anionic-active surfactants of the organic sulfate or sulfonate-type derivatives, and most preferred are the alkyl benzene or alkyl naphthalene sulfonates. The Bauer et al. patent also teaches that cationic and nonionic surfactants are "totally ineffective as additives in improving the crystallization of sodium bicarbonate." It states that "various theories have been considered in an effort to explain the clearly established, unique effectiveness of the anionic-active surfactants" and "the complete lack of effectiveness of the cationic and nonionic classes," but those theories "have all failed to fully explain" the "unexpected result" of anionic surfactant activity.

Crystal growth modifiers can impart positive and/or negative influences, with the goal being to enhance the positive and reduce or eliminate the negative. In inorganic solution crystallization, the manner in which modifiers function on the molecular level is unpredictable and speculative.

There is another factor involving such modifiers. Sodium bicarbonate is used in many food products and processes. Thus, crystallization agents such as the alkyl benzene or naphthalene sulfonates do not have GRAS classification, and at best may only be sparingly used in food grade sodium bicarbonate production. The field is replete with attempts to use commercial dishwasher detergents such as DBSA, Petro AG (DeSoto Chemical Company) with diesel fuel, kerosene or styrene. All of these have serious food grade and GRAS non-approval issues, and are not very efficient modifiers. Other additives have been tried, such as hexametaphosphate, but such additives result in an extremely high loss in yield and extremely dendritic crystal habit which makes them unsuitable for use.

DISCLOSURE OF THE INVENTION

It is among the objects and advantages of the invention to provide a GRAS crystal growth modifier for crystallization of inorganics from aqueous solutions containing Na, Li, K, Ca and Mg cations, and carbonate, bicarbonate, borate, hydroxide, nitrate and sulfate anions, which modifier is a selective crystal size classifier and limiter. It is another object and advantage of the invention to employ lecithin full strength, or in solutions, suspensions, mixtures and emulsions in minor (parts per million) quantities, as an extremely good crystal growth promoter, size classifier, dewatering agent and supersaturation reducing agent. It is still another object and advantage of the invention to provide a process employing adding lecithin in parts per million quantities to aqueous inorganic solutions, for example, of sodium bicarbonate from a variety of sources, including Nahcolite solution mining and brine mining pregnant liquor, as an improved crystal growth promoter and which reduces both heat exchanger and crystallizer scaling. It is another object and advantage of the invention to provide a method for introduction of lecithin in controllable parts per million quantity to aqueous solutions of inorganic ions in a simple, reproducible and effective manner without the need for additional emulsification, detergent, saponification or Ph control agents. These and other objects and advantages are evident from the description of the invention herein.

The invention comprises the use of parts per million quantities of lecithin, particularly lecithin extracted from soybean oil, in the range of from about 2 to about 200 ppm, and more particularly in the range of from about 5 to about 60 ppm as a crystal growth promoter and size classifier for crystallization of inorganics from solutions containing the above-listed cations and anions. By "size classifier" is meant the property of narrowing the range of crystal sizes, especially to within the useful product range of $-425\,\mu m+45\,\mu m$, i.e., $-35$ mesh$+325$ mesh (Tyler mesh).

The lecithin may be added to the inorganic solution in one or more crystallizer tank(s), flow lines, and/or pregnant liquor tanks. It may be added directly in non-emulsified or non-solvated, unmixed, as received, full strength form in commercial operations and this form of addition is best accomplished by high shear mixing. The beneficial effects are slow to develop with slow mixing. To achieve best results, the full strength lecithin is best added upstream of high speed rotating pump impellers. Crystallization of sodium bicarbonate is discussed in detail herein by way of example and not by way of limitation of the principles of the invention.

An alternative and equally preferred method is to premix the lecithin with pregnant or barren liquor in the range of from room temperature to 250° F. to form a solution on the order of from 200 to 20,000 ppm, and more preferably from 200 to 10,000 ppm, and introduce this mixture into one or more crystallizer tanks, pregnant liquor tanks or other suitable injection point in the process. Premixing with hot or warm pregnant liquor is preferred so there is less process dilution, but if long shelf life at room temperature is required, barren or at best near saturated (with respect to $CO_3^-/HCO_3^-$ ions) is preferred as less likely to crystallize out pending use. The lecithin pregnant or barren liquor mixture is termed "the additive mixture," but it should be understood that term includes true or partial emulsions, suspensions, or solutions of lecithin in the aqueous carrier or other solvent. The pH can range from about 8 to 12 and is preferred to be in the range of from about 8 to about 10, and carbonate and/or bicarbonate ions are preferably present in the additive mixture. When the term "lecithin" is used herein, it should be understood to include both full strength lecithin per se and the additive mixture, or equivalent mixtures, emulsions, suspensions or solutions in an aqueous carrier or other solvent.

It should be understood that by using full strength lecithin or the additive mixture as a crystal growth promoter, it is possible to adjust the quantity of use thereof to produce large crystals on the order of the size of beach sand in the range of 1/64 inch to 1/8 inch. These crystals are extremely useful as a sandblast agent which, unlike sand does not raise serious health (silicosis) and environmental issues. Accordingly, while the above-mentioned ranges for the use of lecithin are preferred for producing food grade bicarb product crystals in the preferred range of $-425\,\mu m\ +45\,\mu m$ in size, there may be other uses for larger or smaller products. However, the inventor has found, for example, the use of from about 5 to about 30 ppm of lecithin, and preferably 10±ppm, in a commercial plant demonstration not only eliminates the oversize (crystals of size not passing a 425 $\mu m$ opening screen) but also the undersized, (that is, the quantity of crystals passing through a screen having 45 $\mu m$ openings) are reduced by some 33%.

It is important to note that in bench scale testing the amount of lecithin, expressed in ppm, is some 3–10 times greater than that required in actual plant (commercial) operations. For example, optimum in bench scale is in the 20–60 ppm range, while the range of 5–20 ppm is optimum for the $-425\,\mu m+45\,\mu m$ product in current commercial operation, and 5–15 ppm is the most preferred operating range in the plant.

THE DRAWINGS

The invention is illustrated with the drawings in which:

FIG. 1 is a graphical representation of bench scale crystallization tests recovery of bicarbonate from solution both without use of lecithin and with use of lecithin up to about 80 parts per million in which the size classification and crystal growth promotion effects are particularly evident; and FIG. 2 is a schematic flow sheet of a crystallization process showing multiple points of introduction of lecithin as a crystal growth promoter and classifier.

DETAILED DESCRIPTION OF THE BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention. Underlying the principles of this invention is the discovery that lecithin has proven to be an unexpectedly excellent crystal growth promoter and classification agent for production of sodium bicarbonate by cooling from saturated and supersaturated solutions containing bicarbonate ion in the concentrations described herein. It is entirely unexpected that lecithin functions as an excellent size classification agent, in that by selection of amount (in ppm) it limits the quantity of both oversized and undersized crystals, or can produce very large, non-dendritic crystals for special use applications.

Lecithin also serves to function as a dewatering agent in two ways: First, expelling water in a hydrophobic manner; and Second, it produces a less dendritic, more clear and pure crystal with fewer inclusions. Lecithin reduces supersaturation in the preferred concentration range, in that crystallization is promoted sooner, i.e., crystal growth appears at lower supersaturation and reduces the crystallization scaling rate, including in heat exchangers, crystallizer tanks, piping and agitators.

Heat exchanger scaling is true crystallization as the mass transfer coefficient is high when the solution is hot; upon cooling in the heat exchanger the scale grows rapidly through crystallization. Ordinarily, the practice in the industry is to minimize the ΔT in a given heat exchanger while the solution is hot in order to minimize the scaling. Thus, in solution mining processes where the pregnant liquor comes out of the ground quite hot, it is ordinarily necessary to step down in temperature by many small heat exchange steps, each having small thermal differences to minimize the scaling. In this invention, by use of lecithin introduced upstream of the heat exchanger, e.g., in the pregnant liquor tank, crystallizer supersaturation and heat exchanger scaling rates are reduced, allowing use of fewer heat exchangers, and greater ΔT in each. Improved crystallization growth kinetics results in reduction in plant capital and production costs. For example, use of lecithin can permit reconfiguring a 4-crystallizer-in-series plant into 4 crystallizers in parallel or two sets of two in parallel, resulting in a low cost production rate increase.

In contrast, crystallizer scaling tends to be a kinetic process whereby extremely small fines cement themselves together on tank and pipe walls, paddle surfaces and the like during the flow of the liquor. The use of the lecithin in the crystallizers not only promotes crystal growth therein, but also reduces the crystallizer scaling by control of fines and reduction in supersaturation.

Lecithin is also known as phosphatidylcholine, lecithal, vitellin, kelecin, and granulestin. Most generically it is a mixture of the diglvcerides of stearic, palmitic and oleic acids, linked to the choline ester of phosphoric acid. Lecithin is available as animal, vegetable or synthetic types. The typical commercially available lecithin which may be used in the process of this invention is predominantly soybean lecithin obtained as a by-product in the manufacture of soybean oil. Soybean lecithin contains, on average, the following organic long chain acids: palmitic 11.7%, stearic 4.0%, palmitoleic 8.6%, oleic 9.8%, linoleic 55.0%, linolenic 4.0%, and $C_{20}$ to $C_{22}$ acids (including arachidonic acid) 5.5%. Lecithin in the Kirk-Othmer Encyclopedia of Chemical Technology, Volume 14, (Wiley-Interscience, New York, 3rd Edition, 1981) pages 250–269 is represented as follows:

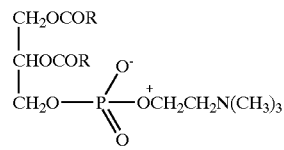

The physical properties of lecithin change depending on the acid value. When the acid value is about 20, lecithin is a waxy mass. It is a viscous fluid when the acid value is around 30. The color varies, being nearly white when freshly made, but rapidly becomes yellow to brown in air. The density is 1.0305 and has an iodine value of 95 with a saponification value of 196. It is ampholytic, and is generally insoluble in water but swells both in water and a sodium chloride solution forming a colloidal suspension. Thus, when referring to an aqueous lecithin "mixture" herein, that includes both a true or partial emulsion, a colloidal suspension and a solution. Where the mode of introduction of lecithin into the crystallization process is a premixed 200–20,000 ppm "mixture" of lecithin in water, it should be adjusted to a pH in the range of from about 8 to about 12, with the preferred range being from about 8 to about 10.

Lecithin is used in other industries as an edible and digestible surfactant and emulsifier of natural origin, primarily used in margarine, chocolate and in the food, pharmaceutical and cosmetics industries. Its therapeutic category is lipotropic.

While I do not wish to be bound by theory, my observations and the results of experiments and commercial scale operation described herein leads me to believe that the complex ampholytic nature of lecithin plays an important part in the unexpected results discovered. Being a zwitterion, lecithin's spaced charges may be responsible for increase in overall growth rate at lower supersaturation levels, improved growth rate balance among the three principal individual crystal growth faces, and suppression of dendritic face growth. On a molecular level, lecithin is a complex three-dimensional particle that may orient, channel or maintain the crystal growth on major faces in some, as yet unknown, way.

While anionic surfactants promote growth, they do not appear to exhibit a classification function. That is, they do not produce a narrower crystal size distribution curve by reducing both oversize and undersize for a given set of operating conditions. The classification property may be due to the cationic end of the lecithin, and its relative charge separation from the anionic portion. Note, in striking contrast, cationic and nonionic surfactants are unsuitable (commercially inoperative) as GRAS bicarb crystal growth promoters. Thus, it is surprising that the presence of the cationic portion of the lecithin does not appear to cancel its anionic portion, With the molecule being net equivalent nonionic. I believe that the shape and size of lecithin preferentially orients and guides the relatively large and ionic bicarbonate and sodium ions into position on the nucleation crystal face, speeds the growth process in a mass accretion sense, suppresses dendritic side branching, with the result that fines and dendritic crystals are reduced and the crystal size (and therefore the size range) becomes more a function of degree of supersaturation or residence time at given crystallizer operating conditions, at least until stirring shear forces overbalance crystal growth causing physical limitations (as distinct from crystal growth limitations) as crystal size increases. In this sense, lecithin may be characterized as a crystallization catalyst, in that it both orients and speeds crystal growth.

Thus, this invention in its broadest application covers the discovery of the use of organic ampholytic molecules as inorganic crystal growth promoters and control agents, including classification agents, and particularly organics that are natural or synthetic GRAS compounds, such as long chain ampholytic functionalized acids, proteins, peptides, lipids, and the like.

The lecithin can be made to go into solution, suspension or emulsion by use of a soap or detergent, and by full or partial saponification in water with sodium hydroxide at a pH in the range of from about 10 to about 12. As such, a saponified or partially saponified lecithin "solution" (true solution, emulsion, mixture or colloidal suspension) has beneficial effect in the process of this invention. That is the presently preferred mode of introduction of the lecithin solution according to the process of this invention for non carbonate/bicarbonate-rich saturates. But for carbonated and/or bicarbonate-rich solutions, the presently preferred best mode is use of a high concentration of carbonate and/or bicarbonate ions at a pH of in the range of from about 8 to 10 to produce the lecithin additive mixture of this invention (understanding mixture to include true solutions, emulsions, suspensions and mixtures). The carb/bicarb concentration (reported as equivalent % $Na_2CO_3$) may range from about 0.5–30% by weight. It is important to this aspect of the invention to have an adequate carbonate or bicarbonation concentration to promote the formation of the aqueous lecithin additive mixture. It is preferred to form the aqueous additive mixture with a concentration of from about 200 to 10,000 ppm lecithin, which is then easily added directly to the crystallizer(s), or upstream thereof in the pregnant liquor tank, or in the recirculation heat exchanger circuits. Premixing can be done in any slipstream, e.g., a pregnant liquor slipstream providing 200 ppm lecithin can be employed.

While any commercial source of lecithin may be used, we prefer soybean lecithin with an acid value in the range of from about 25 to 35. A particularly suitable soybean oil lecithin has an average acid value on the order of 30 and can be characterized as a pourable, translucent golden to brown thick fluid having a viscosity ranging from moderate to relatively viscous (thick) honey. A good food grade and kosher soybean oil lecithin can be obtained from PPG Industries.

One of the advantages of using lecithin in the process of this invention lies in the fact that during periods of drift in brine grade and/or natural trace constituents (e.g., non-bicarbionic or mineral constituents) coming up with the pregnant liquor from underground, excess fines tend to increase in unpredictable ways. While greater production rate can be obtained by increasing both the cavity and the pregnant liquor tank temperatures from the typical 200–250° F. in cavity and 170–200° F. in the pregnant liquor tank, substantial increases in temperature can adversely affect the type and quantity of trace constituents being leached from the cavity, and in turn how they react with hot pregnant liquor rich in carbonate-bicarbonate ions. This affects the pregnant tank bleed vapor vent rate. Wet cake washes can also be used to reduce increased impurities, but that added process step can adversely impact production rate and yield. The vessel wall, pipe wall, heat exchanger and impeller surface corrosion rates can also vary widely during such process drift. In accordance with the process of the invention, use of lecithin results in the ability to retain control of crystallization during such periods of drifting natural trace constituent concentrations, without need for substantial process changes such as temperature and bleed rate. The use of lecithin has great advantages in that it buffers the process against brine grade and/or natural trace constituents drifts. It also increases production rate and improves product quality, permitting production of highly uniform food grade bicarb product.

TEST PROCEDURE AND EXAMPLES

Examples 1–7

Bench Scale Tests

A 4-position gang agitator comprising large, slow speed paddles were mechanically connected for uniform speed. That is, there was simultaneous agitation of all four samples. By the paddles being arranged in a single gang, they could all be turned simultaneously at the same speed. In each test, an untreated pregnant liquor sample direct from the underground solution mine (sample with no lecithin) was run with three samples each treated with a different concentration (in parts per million) of lecithin. Typical pregnant liquor and barren liquor compositions were as follows:

TABLE I

LIQUOR COMPOSITION

| COMPONENT | LIQUOR (wt %) | |
|---|---|---|
| | PREGNANT | BARREN |
| $NaHCO_3$ | 10–13 | 5–7 |
| $Na_2CO_3$ | 0.5–4 | 0.5–4 |
| NaCl | 5–8 | 5–8 |

600 milliliter samples were placed in 1,000 milliliter plastic beakers and were air cooled to room temperature (approximately 70±10° F.) while being agitated. The untreated sample was considered the baseline "control" sample in each four-sample test run. Several non-recorded runs were made in order to develop the appropriate procedures.

When lecithin was added full strength, i.e., not as water/lecithin additive mixture but directly, slow mixing was observed with the bench scale agitator. Most of the lecithin stuck to the beaker walls, but based on the inventor's prior experience in additive testing, there was enough visual clarity improvement over controls to warrant further testing. Full strength use of lecithin is suitable for plant operation when added via impeller pumps where the shear forces provide rapid and thorough mixing. Thus, in actual production-scale tests, full strength lecithin was added directly to a 20,000 gallon crystallizer tank and improved crystal growth was observed.

In a second bench scale approach, lecithin was mixed with sodium hydroxide (pH 11) to provide a partly saponified solution, or colloid suspension or emulsion. In the Table II below, this saponified lecithin solution was used in Examples 1–5 and is identified as lecithin mixture M-1. It was later discovered that NaOH addition, while useful, was not necessary, and any soap or detergent in trace amounts would put lecithin in solution.

In a third, best mode approach, commercial full strength lecithin was premixed in pregnant or barren liquor to a 10,000 ppm by weight dilution, hot pregnant liquor being preferred, and introduced into the pregnant liquor tank. Typical liquor compositions are shown in Table I above. Barren liquor is the liquor exiting the last crystallizer tank after solids removal. The barren liquor is reheated for injection into the underground solution mine. This barren liquor contains both carbonate and bicarbonate ions and has a pH on the order of 9.5. Lecithin mixes at a commercially feasible rate in both the pregnant liquor (warm or hot) or the room temperature barren liquor, forming the aqueous lecithin additive mixture (solution, suspension or emulsion). This concentrated 10,000 ppm aqueous lecithin additive mixture was easier to handle and resulted in more effective crystal growth promotion and classification in subsequent tests. This was used in Examples 6 and 7 below, and is identified as aqueous lecithin additive mixture M-2.

By way of comparison, in a search over an extended period approximately 100 crystal growth modifier candidates had been tested by addition to hot saturated sodium bicarbonate solution and observation of crystallization results during an agitated cool down cycle. Most candidates were easily rejected based on visual and feel indicators. Initial visual indication is gained during the nearly one hour crystallization cooling process. A uniform milky appearance is a failure indication, being an indicator of excessive fine crystals. Improved performance is indicated by the appearance of a less milky non-uniform slurry as the mixture in the beaker cannot carry the larger crystals to the upper portion of the beaker. A faster settling rate provides addition success indication at the end of the cool-down cycle when the agitation is removed and the slurry settles. Once settling is observed, one skilled in the art can tell if improved crystallization has been accomplished simply by the feel of the crystals in the bottom of the beaker. The successful candidates were subjected to additional testing. Of these, many failed to provide acceptable crystal yield and shape, often producing only a few highly dendritic large crystals by creating extreme supersaturation. The few remaining candidates failed to be food grade and Kosher. Of these, only one additive had greater positive crystal growth influence.

In lecithin Examples 1–7 below, pregnant liquor samples were measured (volumetrically in Examples 1 and 2, and weighed in Examples 3–7) and treated with various lecithin concentrations as set forth in Table II below, in which "M-1" is the aqueous lecithin additive mixture that is produced by saponification in pure water with sodium hydroxide at pH 11, while "M-2" represents the mixture of lecithin in barren liquor at pH 9.5.

TABLE III

| EXAMPLE NO. | LECITHIN ppm | BICARB yield (wt %) | FINES (−45 μm) (wt %) |
|---|---|---|---|
| 6 | 0 | 100 | 29 |
| 7 | 0 | 100 | 45 |
| 6 | 18 | 101 | 15 |
| 7 | 28 | 101 | 8 |
| 7 | 37 | 102 | 7 |
| 6 | 43 | 99 | 4 |
| 7 | 46 | 101 | 3 |
| 6 | 78 | 92 | 6 |

FIG. 1 shows graphically the reduction in undersize effect of lecithin. The lower curve shows the reduction in the −45 μm undersize by addition of lecithin in the composite product of Examples 6 and 7. The minimum production of undersize, by "best curve" method, appears in the range of from about 45 to 75 ppm. At the same time, the −425 μm +45 μm product yield (upper curve) as a percentage of the total crystalline bicarbonate recovered, by best curve method, reaches a maximum in the range of between about 30 and 65

TABLE II

LECITHIN CRYSTAL MODIFIER

| Example | Pregnant Liquor ml or gm | LECITHIN gms | LECITHIN ppm | BICARB PRODUCT gm | BICARB PRODUCT yield % | SIZE (wt %) % +425μ | SIZE (wt %) % +150μ | SIZE (wt %) % +45μ | SIZE (wt %) % −45μ | −425 + 45μ Product |
|---|---|---|---|---|---|---|---|---|---|---|
| #1 (M1) | 600* ml | 0 | 0 | 43.7 | 100 | 0 | 19 | 72 | 28 | 72 |
| | 600 ml | 0.6 | 10 | 43.2 | 99 | 9 | 25 | 72 | 28 | 63 |
| | 600 ml | 1.2 | 20 | 41.3 | 95 | 8 | 16 | 70 | 30 | 62 |
| | 600 ml | 1.8 | 30 | 42.3 | 97 | 10 | 22 | 79 | 21 | 69 |
| #2 (M1) | 600* ml | 0 | 0 | 44.9 | 100 | 3 | 16 | 71 | 29 | 68 |
| | 600 ml | 3 | 50 | 44.9 | 100 | 6 | 29 | 85 | 15 | 79 |
| | 600 ml | 3.6 | 60 | 43.9 | 98 | 10 | 31 | 86 | 14 | 76 |
| | 600 ml | 4.2 | 70 | 42.9 | 96 | 6 | 38 | 91 | 9 | 85 |
| #3 (M1) | 658* gm | 0 | 0 | 40.6 | 100 | 0 | 13 | 63 | 37 | 63 |
| | 641 gm | 9 | 140 | 39.2 | 97 | 0 | 24 | 78 | 22 | 78 |
| | 643 gm | 15 | 233 | 36.7 | 90 | 0 | 24 | 70 | 30 | 70 |
| | 639 gm | 24 | 376 | 28.7 | 71 | 12 | 54 | 93 | 7 | 81 |
| #4 (M1) | 656* gm | 0 | 0 | 41.3 | 100 | 3 | 26 | 73 | 27 | 70 |
| | 656 gm | 5 | 76 | 39.9 | 97 | 6 | 24 | 80 | 20 | 74 |
| | 652 gm | 5.7 | 87 | 39.6 | 96 | 4 | 32 | 83 | 17 | 79 |
| | 649 gm | 7.7 | 119 | 39.9 | 97 | 4 | 26 | 83 | 17 | 79 |
| #5 (M1) | 662* gm | 0 | 0 | 41.6 | 100 | 9 | 31 | 68 | 32 | 59 |
| | 658 gm | 0.6 | 9 | 41.8 | 100 | 8 | 31 | 78 | 22 | 70 |
| | 660 gm | 1.3 | 20 | 42.6 | 102 | 7 | 29 | 71 | 29 | 64 |
| | 652 gm | 3 | 46 | 41.9 | 101 | 5 | 42 | 82 | 18 | 77 |
| #6 (M2) | 648.5* gm | 0 | 0 | 38.6 | 100 | 16 | 39 | 71 | 29 | 55 |
| | 654.4 gm | 1.2 | 18 | 38.8 | 101 | 20 | 51 | 85 | 15 | 65 |
| | 650.9 gm | 2.8 | 43 | 38.3 | 99 | 19 | 59 | 96 | 4 | 77 |
| | 643.6 gm | 5 | 78 | 35.5 | 92 | 18 | 57 | 94 | 6 | 76 |
| #7 (M2) | 647.8* gm | 0 | 0 | 34 | 100 | 7 | 19 | 55 | 45 | 48 |
| | 644.5 gm | 1.8 | 28 | 34.4 | 101 | 9 | 29 | 92 | 8 | 83 |
| | 648.6 gm | 2.4 | 37 | 34.7 | 102 | 3 | 23 | 93 | 7 | 90 |
| | 652.4 gm | 3 | 46 | 34.3 | 101 | 15 | 48 | 97 | 3 | 82 |

Table II - Notes:
*Control - This row in each example
M-1 preparation: 1 gm PPG MAZU 332-207 plus 100 gm water plus 2 pellets $Na_2OH$, pH11 for 10,000 ppm solution, EX 1-5.
M-2 preparation: 1 gm PPG MAZU 332-207 plus 100 gm barren liquor for 10,000 ppm solution, pH 9.5, EX 6 and 7.
PROCEDURE: Added the above to fresh pregnant liquor at various concentrations, cooled to room temperature while being stirred by 4 gang mixer, dewatered, dried, and weighed, screened and viewed under microscope.

Examples 6 and 7 are first summarized in Table III, below, and then shown graphically in FIG. 1 with the dashed and solid lines being the composite of both Examples 6 and 7.

ppm. As noted above, the trough and maxima will move from that shown in FIG. 1 to from about 2 to about 30 ppm in commercial operation. It is a simple matter for one skilled in the art to determine optimum lecithin concentration for a given crystallization circuit and/or crystallizer.

In bench testing, there is a trough existing at about 40 ppm where the undersize is drastically reduced. In Plant Demonstration tests (see Example 8, Table IV, below), the oversize at 0 ppm (control) is 6–7% of the total bicarb recovered, whereas at 7–10 ppm it has been eliminated, a reduction of 100%. For bench scale Examples 6 & 7, the undersized at the 0 ppm control represents 37% of the total bicarb produced, whereas with use of the lecithin at 40 parts per million, the undersize is reduced to 5%, an 86% reduction.

For commercial scale operations on the order of 20,000 gallon crystallizers producing product in the range of −425 $\mu$m+45 $\mu$m, both undersize and oversize troughs are present at around 10±5 ppm. This is the classification phenomenon. Note the reduction of oversize is a phenomenon that is not apparent until one gets to production scale operations.

In addition to yield and screen size analysis as presented in Tables III (above) and IV (below), the samples were visually examined for crystal habit. Overall the appearance of the crystal habit shows less fines and dendritic shapes. The product in a commercial operation was improved in all aspects of dewatering, less impurity inclusion and less material handling breakage during drying and handling. During the runs of the Examples above, the use of the additive mixture reduces or eliminates scaling on the beakers and on the paddles. In the controls, in each case without exception, hard scale formed on the leading edge of the agitator blades and to a lesser extent on the walls and bottom of the beaker. These scale deposits had to be scraped off in order to obtain figures for the total quantity of bicarbonate crystals produced. In contrast, all of the lecithin-treated samples were scale-free during the test runs. Indeed, prior to use of lecithin, plant shunt down to descale was required every 30 days or so. After use of lecithin the plant can be run 60–80 days before descaling washout is required.

It is an important observation that the use of the lecithin imparted a more or less cloudy appearance to the room temperature pregnant and barren liquor. The result was that the samples could be easily visually identified by the degree of cloudiness as between samples having 0, 10, 20 and 30 parts per million of lecithin. Thus, visible, IR or UV optical absorbency, scattering or reflection methods for monitoring lecithin concentration can be employed in the process of the invention. The cloudy appearance for the most part remained unchanged following the cooling crystallization process, indicating that the lecithin additive largely remained in solution following crystallization.

In an important subsequent observation, we have determined that the lecithin remaining in the barren liquor appears to be scavenged in the solution mining cavity at the concentrations employed (possibly by clay or other mineralizations), thus not causing upset of the process conditions by a buildup of lecithin in the production well output pregnant liquor over long periods of time. The effectiveness of lecithin is not affected by its introduction into the hot pregnant liquor of the pregnant liquor tank, which typically in steady state operation is maintained at about 190° F. This temperature is too high, at the lecithin concentrations used herein, to initiate crystallization, and extended residence time therein does not appear to functionally degrade the performance of the lecithin.

FIG. 2 is a schematic of the crystallization process of this invention in which a hot pregnant liquor is withdrawn from an underground solution mine 1, and piped to a closed, pressure regulated pregnant liquor tank 2. In plant operation, the lecithin is added full strength, e.g., by meter pump addition or batchwise by dumping a beaker of lecithin in an amount calculated to give lecithin concentration in the desired range of 5–15 ppm. The concentration of lecithin may be monitored, preferably at least daily, both in the pregnant liquor tank 2 or in one or more of the crystallizers 3–6 (crystallizers numbers 1–4 in FIG. 2). These crystallizers are typically in series, and at each stage a recirculating stream (from and back to the crystallizer) cools the liquor, with the recovered heat being generally transferred back to the barren liquor in line 10 which exits the separation stage 11 on its way to the barren liquor tank 13. It is subsequently heated and reinjected under pressure into the well 1. The heat exchangers 14, 15, 16, 17 are shown schematically, as the heat recuperation circuits and procedures are conventional. The presence of lecithin in the line exiting the pregnant liquor tank 2 and in each crystallizer 3, 4, 5, 6 reduces and controls scale formation in the heat exchangers 14, 15, 16, 17. Refrigeration 18, e.g., by evaporative cooling tower, may be employed in the last stage crystallizer 6.

The preferred addition is to point #1, the pregnant liquor tank. A chase stream 20 of pregnant liquor is piped to dilution tank 22 into which fines overflow 24 from the recovery stage 11 are introduced. In addition, full strength lecithin 25 is introduced in an amount to produce a premix 26 of about 200 ppm, which is pumped 27 to the pregnant tank 2 to provide the selected concentration in the range of 5–30 ppm, preferably 10±5 ppm in the circuit. It may also be pumped 28 to one or more of addition points #2–#5 as shown.

Alternatively, a slipstream of barren liquor 30 may be taken from the barren liquor tank 13 and full strength commercial food grade lecithin is mixed therewith in tank 32 to produce a 200 ppm aqueous lecithin additive premix 34 for addition as aforesaid at any one or more of introduction points #1–#5 (tanks 2–6).

At start up, a ½–1 liter priming aliquot of the full strength lecithin may be added in the crystallizers and pregnant liquor tank. This initially provides a 20–25 ppm dose, in crystallizer #1 (tank 3 in FIG. 2) which rapidly spreads downstream to crystallizers #2–#4 for a concentration in the range of about 10+5 ppm.

Wet cake 40 is recovered in separation stage 11 which is dried 42 as product 44.

Example 8

Plant Demonstration

A ½ HP agitator was mounted to a 55 gallon drum into which was piped a continuous stream of barren liquor. The barren liquor stream was tapped off downstream of the recuperative heat exchangers (also downstream of crystallizer #2) to avoid fine bicarbonate solids and scaling. The barren liquor flow was visually estimated at approximately 1 gallon per minute. The lecithin was introduced into the agitated liquor in the drum by piston-type metering pump to form a "premix" mixture of barren liquor with lecithin at about a concentration of 10,000 ppm. The lecithin and barren liquor mixture (premix) was then introduced into the lower mixing zone (well mixed zone) of crystallizer #1 (20,000 gallon tank 3 in FIG. 2) which is the first of four crystallizers in the circuit, at rates calculated to result in 7–12 ppm lecithin. The fines recovery circuit recycled a minor portion of the additive to the pregnant liquor tank.

The initial 12 ppm addition rate was overkill. Addition was terminated when the dried product bulk density reached 88 lb/ft$^3$. Silos designed for sodium bicarbonate are constructed for about 60 to 65 lb/ft³ material as heavier sodium bicarbonate is not commercially available. Clearly, customer expectations and their conveying and storage equipment are not ready for such high density sodium bicarbonate product made possible by lecithin enhanced crystallization. Accordingly, the lecithin addition was cut back to 7 ppm to reduce product bulk density. A 10 ppm addition rate was found to produce the best product as defined by marketability.

As a result of 12 ppm operations, it was observed that wet cake moisture dropped from 12.2 to 6%. The drier recycle bulk density of the product increased from 68 to 88 pounds per cubic foot. The crystallizer No. 3 underflow slurry fines (−45 µm, or 325 mesh) dropped from 15% to 6%, a 65% reduction in quantity. Table IV shows the screen analysis results of crystallization at various ppm of M-2 lecithin premix additive. Note that 12 ppm caused increase in +425 µm oversize, while reduction to the 7–10 ppm range essentially eliminated the oversize. This was the first, unexpected observation of oversize elimination, which, with undersize reduction, constitutes the classification phenomenon.

TABLE IV

PLANT DEMONSTRATION TESTS
Weight % of Total Bicarb Recovered

| LECITHIN | ZERO ppm | 12* ppm | 7 ppm | 10 ppm |
|---|---|---|---|---|
| CRY. #1 UF (a) | | | | |
| +850 µM | 0 | 30 | 0 | 0 |
| −850 + 425 µm | 7 | 18 | 0 | 0 |
| −425 + 150 µm | 32 | 27 | 41 | 32 |
| −150 + 45 µm | 45 | 19 | 52 | 60 |
| −45 µm | 16 | 6 | 8 | 8 |
| CRY. #3 UF (b) | | | | |
| +850 µm | 0 | 14 | 0 | 0 |
| −850 + 425 µm | 6 | 27 | 0 | 0 |
| −425 + 150 µm | 36 | 27 | 50 | 40 |
| −150 + 45 µm | 43 | 26 | 45 | 50 |
| −45 µm | 15 | 6 | 5 | 10 |
| WET CAKE | | | | |
| % moist | 12.2 | 6.0 | 7.8 | 8.0 |
| +850 µm | 0 | 4 | 0 | 0 |
| −850 + 425 µm | 3 | 30 | 0 | 0 |
| −425 + 150 µm | 35 | 38 | 47 | 49 |
| −150 + 45 µm | 47 | 22 | 48 | 46 |
| −45 µm | 15 | 6 | 5 | 5 |
| PRODUCT | | | | |
| +100 mesh | 15 | 35 | 20 | 9 |
| +200 mesh | 41 | 60 | 58 | 46 |
| +325 mesh | 67 | 77 | 82 | 76 |
| pan | 33 | 23 | 17 | 24 |
| lb/ft3 | 68 | 88 | 81 | 74 |

*TEST STOPPED
(a) Crystallizer #1 underflow.
(b) Crystallizer #3 underflow.

References to "Test stopped" for 12 ppm indicates that the test was halted before achieving steady state conditions because the bicarbonate product was becoming too coarse and heavy relative to customer conveying and storage equipment limitations, as the bulk density reached 88 lbs/³ft, while normal density is around 64 lbs/ft³. This does not mean the test was unsuccessful, just that above about 12 ppm lecithin produces a coarse, high density product not preferred for one particular commercial market, but useful in other markets. In commercial operation this oversize boundary for product larger than 425 µm can range from about 12 to about 20 ppm. One can operate above this oversize "boundary" if larger product is desired, and a range of 12 to about 30 ppm is suitable for bicarb product having a substantial percentage of size +425 µm.

INDUSTRIAL APPLICABILITY

Example 9

Commercial Scale Operation

The process of this invention has clear industrial applicability in that lecithin premix has been introduced in each and all of the points #1–#5 (FIG. 3) during production plant operations in the range of from 0 to about 25 ppm. The range of 10±5 ppm (5–15 ppm) produces unexpectedly improved results, including improved yield of product in the −425 µm+45 µm size range, improved crystal habit, narrowing the size range of crystals produced, very significant scale reduction in the crystallization process equipment including vessels, lines, heat exchangers and the like. The lecithin is both GRAS and Kosher approved, so the resulting bicarbonate is food grade product. The lecithin remaining in the barren liquor is captured by clay deposits in the cavity or by other natural means, as evidenced by no substantial buildup in the incoming pregnant liquor. The wet cake moisture drops, the product bulk density increases by 25%, there is a reduction in both the oversize and undersize fraction (the classification effect), there is reduction in impurity inclusions and there is less breakage during drying and handling, all of which make for an extremely attractive process. The process of the invention also includes a simple and reliable method of introducing the lecithin by mixing full strength commercially available lecithin with the pregnant (preferred) or barren liquor in order to provide a concentrated premix solution to introduce into the crystallizer circuit. In another process approach, premix lecithin solution can be added to introduction points #1 and #2, and full strength may be used at introduction points #3, #4 and #5.

The process of this invention is easily adaptable to bicarb production from brine mining or other processes which have a step or steps of solution crystallization. Likewise, it is applicable to both light and dense soda ash ($Na_2CO_3$) production, sesquicarbonate production, production of NaOH and KOH, and sulfate crystallization, e.g., $Na_2SO_4$ and $CaSO_4$ production.

In this regard, one very interesting application is to $SO_x/NO_x$ pollution control involving wet scrubbing with limestone. Adding lecithin to the scrubber water may control the resulting $CaSO_4/MgSO_4$ crystals. At present, there is a serious problem of dewatering, in that the resulting sludge is extremely difficult to dewater below 15% moisture. Often the sludge has water content in excess of 30%, and forms a very unstable thixotropic material that is expensive and difficult to handle. This increases the disposal costs to the point where disposal becomes the major cost factor in this pollution control process.

It should be understood that various modifications within the scope of this invention can be made by one of ordinary skill in the art without departing from the spirit thereof. For example, this process can be applied to any evaporite mineral deposit, including all the world's known or future discovered deposits including sodium mineral deposits interbedded with oil shale in the U.S., Scotland, Russia, Australia, and elsewhere. The process is also applicable to rare earth (Lanthanide Series) carbonates crystallization. I therefore wish my invention to be defined by the scope of the appended claims as broadly as the prior art will permit, and in view of the specification if need be.

What is claimed is:

1. In the crystallization of carbonate salts from solution mined Nahcolite pregnant liquor having a pH of 8 to 12 comprising at least 10 percent by weight of dissolved sodium carbonate and bicarbonate salts, the improvement which comprises incorporating into said pregnant liquor at a temperature of at least 170° F., at least 2 ppm of a food grade ampholytic crystal growth modifier effective upon cooling of the pregnant liquor with agitation for one hour to provide a non-uniform slurry of less than milky appearance and a relatively fast settling rate upon termination of agitation from which slurry sodium bicarbonate crystals may be recovered.

2. The process of claim 1 wherein the crystal growth modifier is lecithin.

3. A crystallization process as in claim 2 wherein said lecithin is introduced into said process solution: as full strength; as a colloidal suspension in an aqueous salt solution; as a fully or partly saponified mixture, emulsion, suspension or solution; as a mixture, solution, suspension, emulsion of lecithin in water with a soap or detergent; or as a mixture, solution, suspension or emulsion of lecithin in a supersaturated, saturated or undersaturated carrier solution containing carbonate and/or bicarbonate ions; or any combination thereof.

4. A crystallization process as in claim 3 wherein said lecithin is introduce into said process solution in a pregnant liquor containing zone, a crystallization zone, or both.

5. A crystallization process as in claim 3 wherein said lecithin is present in the range of from about 12 to about 30 ppm in said process solution to produce a sodium bicarbonate product of size +425 $\mu$m.

6. A crystallization process as in claim 3 wherein said premix carrier solution is barren solution resulting from recovery of crystallized product from said pregnant liquor solution.

7. A crystallization process as in claim 4 wherein said undersaturated carrier solution is barren solution prior to reinjection into a Nahcolite solution mine.

8. A crystallization process as in claim 2 wherein said lecithin is present in the range of from about 5 to about 15 ppm in said process solution.

9. A crystallization process as in claim 2 wherein said lecithin is introduced into said process solution as a mixture, solution, suspension or emulsion premix of lecithin in an aqueous solution containing carbonate and or bicarbonate ions and having a pH in the range of from about 8 to about 10.

10. The process of claim 1 wherein said crystal growth modifier is supplied in a mixture comprising recycled barren liquor containing carbonate and bicarbonate ions.

11. The process of claim 1 wherein the crystals are in the range of −425 $\mu$M to +45 $\mu$M.

12. The process of claim 1 wherein the bulk density of the crystalline product is in the range of 60 to 65 lb/ft$^3$.

13. A crystallization process as in claim 1 wherein said solution is brine from the group consisting of a saline lake selected from Owens Lake, Lake Natrona, Searles Lake, Lake Magabi, and the crystallized product is selected from the group consisting of sodium bicarbonate, sodium carbonate, sodium borate, and mixtures thereof.

14. A crystallization process as in claim 1 wherein said solution is provided as a brine solution leached from evaporite deposits of the Green River Formation in the Piceance Creek Basin, Colo., and the crystallized product is selected from the group consisting of sodium bicarbonate, sodium carbonate, dense or light soda ash, sodium borate, and mixtures thereof.

15. In a process for the recovery of crystalline sodium bicarbonate from solution mined Nahcolite pregnant liquor, the improvement comprising incorporating into said liquor 7 to 12 ppm of lecithin such that slurry fines of −45 $\mu$M are reduced, and wet cake moisture of crystallized product is reduced.

16. In a process for the recovery of crystalline sodium bicarbonate from solution mined Nahcolite pregnant liquor, the improvement comprising incorporating into said liquor 7 to 10 ppm of lecithin such that oversize crystals of +425 $\mu$M are reduced or eliminated.

17. A crystal growth modifying composition for the crystallization of sodium bicarbonate from solution mined Nahcolite pregnant liquor comprising recycled barren liquor from said crystallization having a pH of 8 to 12, and an amount of lecithin sufficient upon injection into the pregnant Nahcolite liquor to provide 5–30 ppm thereof.

* * * * *